April 10, 1956     B. F. BELL ET AL     2,741,521

PORTABLE SERVING TRAY

Filed May 25, 1954     2 Sheets-Sheet 1

INVENTORS
B. F. Bell
V. E. J. Morgan

BY Wilkinson Mawhinney
ATTORNEYS

April 10, 1956  B. F. BELL ET AL  2,741,521
PORTABLE SERVING TRAY
Filed May 25, 1954  2 Sheets-Sheet 2
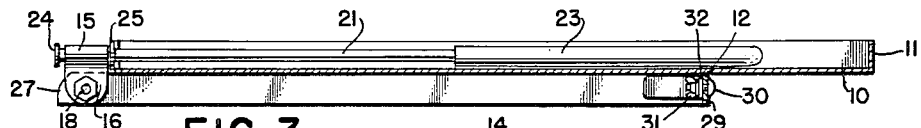
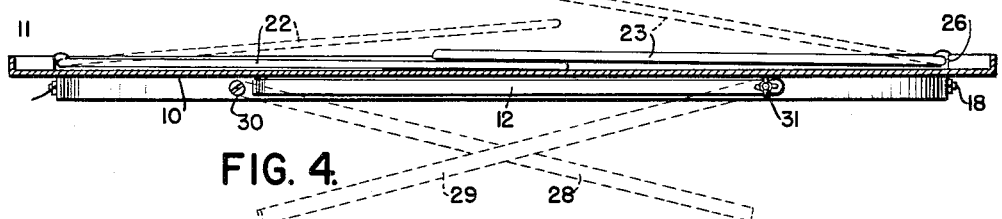
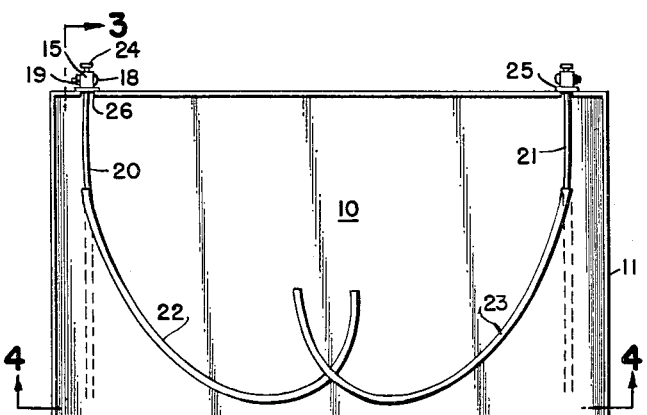
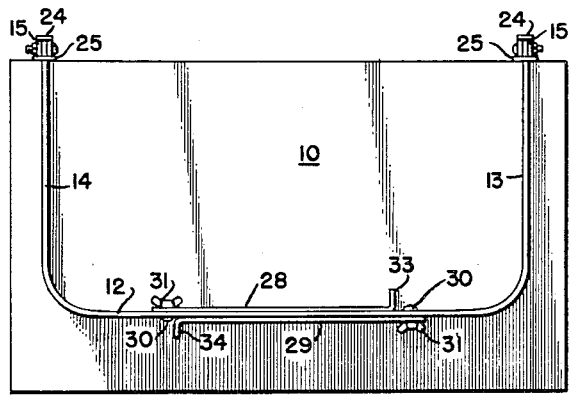
INVENTORS
B. F. Bell
V. E. J. Morgan
BY
Wilkinson Mawhinney
ATTORNEYS United States Patent Office 2,741,521
Patented Apr. 10, 1956

2,741,521

PORTABLE SERVING TRAY

Bernie Franklin Bell and Verna E. J. Morgan, Houston, Tex.

Application May 25, 1954, Serial No. 432,214

3 Claims. (Cl. 311—21)

The present invention relates to portable trays and has for an object to provide a tray suitable for use in an automobile or suspended from the person of a waiter useful in carrying foodstuffs or other desired articles.

Another object of the invention is to provide a portable tray in which the supporting arms and legs can be nested against opposite sides of the pan to provide in the folded position an article of extreme small depths capable of being contained in small stowage space, for instance, beneath the front seat of an automobile where it will always be in readiness for use.

A further object of the invention is to provide a portable tray of a light weight but rigidified by suitable framework to enable the tray to support heavy loads without sagging or distortion.

A still further object of the invention is to provide a portable tray in which a novel form of universal joint is provided for connecting the supporting arms to the tray in a manner which will permit the arms to be folded inwardly of the tray against the face of the pan and within a confining upstanding flange of the pan and at the same time permit of rotation of the arms to enable their bowed portions to lie flat against the pan.

With the foregoing and other objects in view, the invention will be more fully described hereinafter, and will be more particularly pointed out in the claims appended hereto.

In the drawings, wherein like symbols refer to like or corresponding parts throughout the several views:

Figure 3 is a transverse sectional view taken on the line 3—3 of Figure 5 and showing the tray in collapsed condition.

Figure 4 is a longitudinal sectional view taken on the line 4—4 of Figure 5 with the parts in collapsed position and the arms and legs shown partly drawn out in broken lines.

Figure 5 is a top plan view of the tray with the supporting arms folded downwardly and inwardly.

Figure 6 is a bottom plan view of the tray with the legs folded.

Figure 1:
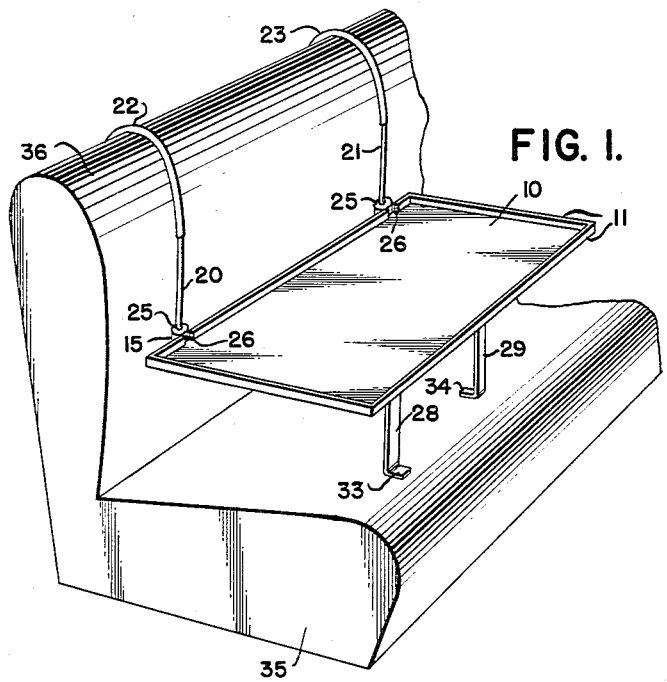
Figure 1 is a perspective view of a form of portable tray constructed in accordance with the present invention and as illustrated in set-up position upon the seat of an automobile which is partly broken away.
Figure 9:
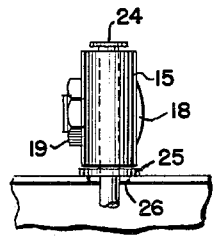
Figure 9 is a top plan view taken on the line 9—9 of Figure 7.

Referring more particularly to the drawings, 10 designates the pan of the tray which may be of metal or other suitable material of a length and width dictated by the use to which the tray is to be put, and 11 represents an upstanding flange all around the marginal edge of the tray 10 which tray is shown to be of substantially rectangular form in the single embodiment of the invention illustrated in the drawings.

Figure 8:
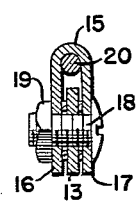
Figure 8 is a vertical sectional view taken on the line 8—8 of Figure 7.

The tray pan 10 is reinforced by a frame which may consist of a cross-bar 12 and longitudinal bars 13 and 14. Such frame is made from strap or bar metal set with one edge against the tray bottom and welded or otherwise secured thereto with the free ends of the longitudinal bars 13, 14 projecting rearwardly beyond the rear edge of the pan 10 where such projecting parts carry bearing collars or sleeves 15 having the tabs or lobes 16, 17 (Figure 8) arranged to receive pivot bolts 18 which also pass through the frame members 13, 14, such bolts 18 being secured in place as by nuts 19 or other fastenings.

The collars 15 receive therethrough the ends of the supporting arms 20, 21 which are flexible or bendable so as to be made to conform to the backrest of an automobile or to the shoulders of a bearer of the tray. Portions of these supporting arms 20, 21 are encased in rubber sleeves 22, 23 or the like to avoid marring or cutting of upholstery cloth, wearing apparel or the like to which the encased bowed portions of the arms 20, 21 may be secured.

The free ends of the arms 20, 21, adjacent the bearing sleeves 15 are peened or upset as shown at 24 to prevent the arms from being pulled accidentally through the bearing sleeves 15 in which such arms are rotatably supported on axes which are disposed angularly to the axes of the pivot bolts 18 about which the bearing collars 15 are adapted to rotate. The angle illustrated in the embodiment shown in the drawings is that of 90°.

The arms 20 and 21 at the ends of the bearing collars 15 opposite to the ends engaged by the upset free ends 24 are provided with washers 25 which are in effect thrust washers and which engage both against the inner ends of the bearing collars 15 and the outside surfaces of the upstanding pan flange 11 at the rear edge of the pan and adjacent slots 26 in such upstanding flange 11 provided to receive therethrough the arms 20, 21 when the arms are folded down against the upper surface of the pan 10.

As seen more particularly in Figure 3, the free edges of the projecting parts of the longitudinal bars 13, 14 are rounded or inclined as at 27 over which the ends of the arms 20, 21 included within the bearing collars 15 may ride when the arms are being erected from the folded position.

Legs 28, 29 may be attached beneath the pan if desired. Conveniently, the cross-bar 12 forms a suitable attachment connection to which the legs are pivoted upon bolts 30 having winged nuts 31 thereon which may be tightened to hold the legs in either folded or outstretched positions. Spring washers 32 may be fitted to the bolts 30 to be compressed by the winged nuts 31 when tightened.

The legs 28, 29 may have angularly turned feet 33, 34 adapted to rest upon an automobile seat 35 as indicated in Figure 1 or upon any other suitable support. In Figure 1, the backrest 36 is shown as having the bowed engaged portions of the supporting arms 22, 23 fitted thereover.

Figure 2:
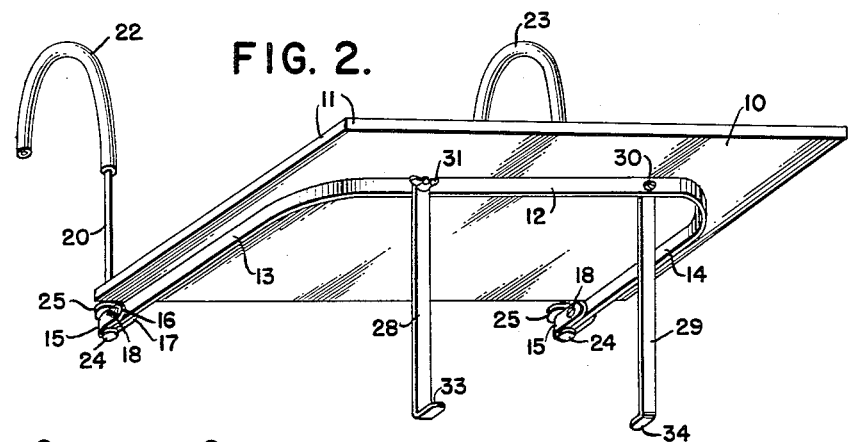
Figure 2 is also a perspective view of the tray from a bottom viewpoint showing the tray in open position as used.

In the use of the device, the encased portions of the arms 22, 23 may be engaged over the backrest 36 as shown in Figure 1 and the pan 10 will be supported in a substantially horizontal position at an elevation above the seat. The legs 28, 29, are not required in all instances because the frame 12, 13, 14 extends beneath the pan 10 over a wide area and it is this frame that is directly connected to the supporting arms 20, 21. The bearing collars 15 are in the vertical position when the tray is in use and the curved or inclined edges 27 of the projecting parts of the frame act to cam out the portions of the arms 20, 21 that are confined in the sleeves 15 so that in the vertical position of the arms 20, 21, the parts 15, 20, 21, 27 and the frame are tightly gripped together to retain the frame in a substantially horizontal position. The upstanding flange 11 also tends to rigidify the pan 10 and due to the fact that the frame 12, 13, 14 has its edgewise dimension vertical and because it is offset with respect to the upstanding flange 11, makes for an extremely strong and rigid construction even though the tray be made of some light material such as aluminum or some combination of aluminum and steel.

Where greater loads are to be supported, the legs 28, 29 may be let down to the positions of Figures 1 and 2 by first loosening the butterfly nuts 31 and after adjusting the legs to the new positions retightening these nuts; in which event the feet 33, 34 which are preferably turned in relatively opposite directions to give greater stabilizing effect, engage and rest upon the cushion of the vehicle seat 35.

The arms 20, 21 are bendable or ductile so that they may be shaped to any particular form of backrest 36 or may be made to conform rather accurately to the shoulders of a tray bearer.

It will be appreciated that the frame 12, 13, 14 may be of steel. It is in substantially U shape and the same may be soldered to the bottom of the pan 10. A convenient size of tray will be 16 inches long by 11 inches wide.

When the tray is to be folded, the legs 28, 29 are rotated about the pivot bolts 30 after loosening the nuts 31 until such legs are swung upwardly against the bottom of the pan 10 in which event one leg is disposed at one side of the transverse frame bar 12 and the other leg is disposed at the opposite side of this bar. The legs are wholly within the confines of the frame.

Figure 7:
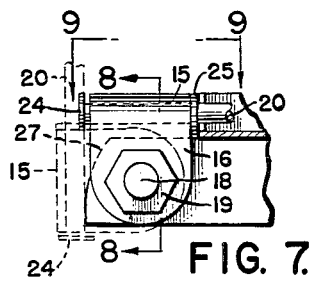
Figure 7 is a fragmentary detail view with parts broken away and parts shown in section of the universal joint between the pan and supporting arms.

The arms 20, 21 are folded downwardly upon the upper surface of the pan 10, which movement is permitted by the pivot bolts 18. In executing this movement, the bearing collars 15 move from the vertical dotted line position of Figure 7 to the horizontal full line position, the arms 20, 21 entering downwardly through the slots 26 enabling the arms to be accommodated within the confines of the upstanding pan flange 11. The bowed portions of the arms 22, 23 may also be turned inwardly and against the upper surface of the pan 10 due to the rotation of the arms 20, 21 in the bearing collars 15. The arms may be made of aluminum and steel. Such arms will also be adjustable to the windowsills or other parts of an automobile.

It is important to note from Figure 3 that the entire vertical thickness of the device in folded position may be brought down to a dimension of not over two inches; in other words, the combined vertical heights of the flange 11, tray 10 and frame 12, 13, 14. The legs are accommodated within the frame and the arms within the flange 11 so that the supporting members of the tray add no bulk whatever to the folded article which may be placed out of the way under the front seat of an automobile or in the luggage compartment.

The device is particularly useful in automobiles but it is also serviceable in private homes, convalescent homes and hospitals, and may be used by wheelchair patients for reading, writing, dining and many other uses. It also finds service on picnics for both adults and children. By adjusting the arms to the shoulders of a person, the device may be used in restaurants by waiters and waitresses.

Although we have disclosed herein the best form of the invention known to us at this time, we reserve the right to all such modifications and changes as may come within the scope of the following claims.

What is claimed is:

1. A portable tray comprising a pan having an upstanding flange with slots therein, bowed foldable and rotatable arms having parts adapted to swing up and down out of and into the slots, outrigger supports on the lower part of the pan at the slots, bearings pivoted to the supports in which the arms are rotatable, and parts movable with the bearings adapted to abut the flange about the slots when the bearings are moved to erect position.

2. A portable tray comprising a pan, projections on the pan having free cam edges, bearing collars pivoting on said projections and having internal spaces in open communication with the cam edges, and supporting arms having trunnion portions rotatable in said bearing collars and positioned to ride outwardly on the cam edges incident to the upfolding of the arms outwardly from the pan whereby the trunnion portions will be jammed outwardly against the outer portions of the bearing collars.

3. A portable tray comprising a pan, projections on the pan having free cam edges, bearing collars pivoting on said projections and having internal spaces in open communication with the cam edges, and supporting arms having trunnion portions rotatable in said bearing collars and positioned to ride outwardly on the cam edges incident to the unfolding of the arms outwardly from the pan whereby the trunnion portions will be jammed outwardly against the outer portions of the bearing collars, and legs connected to the pan for supporting the pan when carrying a load to prevent further relative movement between the trunnion portions of the supporting arms and the cam edges to prevent jamming of the trunnion portions with parts of said projections beyond the cam edges.

References Cited in the file of this patent

UNITED STATES PATENTS

| | | |
|---|---|---|
| 1,542,163 | Morde | June 16, 1925 |
| 2,289,945 | Wadsack | July 14, 1942 |
| 2,304,705 | Pate | Dec. 8, 1942 |
| 2,312,608 | Wadsack | Mar. 2, 1943 |
| 2,510,646 | Meers | June 6, 1950 |
| 2,556,724 | Hubsch | June 12, 1951 |
| 2,601,177 | Smullen | June 17, 1952 |
| 2,645,547 | Channer, Jr. | July 14, 1953 |